United States Patent [19]

Yamaguchi

[11] 4,306,984

[45] Dec. 22, 1981

[54] OIL SOLUBLE METAL (LOWER) DIALKYL DITHIOPHOSPHATE SUCCINIMIDE COMPLEX AND LUBRICATING OIL COMPOSITIONS CONTAINING SAME

[75] Inventor: Elaine S. Yamaguchi, El Cerrito, Calif.

[73] Assignee: Chevron Research Company, San Francisco, Calif.

[21] Appl. No.: 160,803

[22] Filed: Jun. 19, 1980

[51] Int. Cl.$^3$ .............................................. C10M 1/48
[52] U.S. Cl. ............................. 252/46.7; 252/32.7 E; 252/389 A; 252/400 A
[58] Field of Search .......................... 252/32.7 E, 46.7

[56] References Cited

U.S. PATENT DOCUMENTS

| | | | |
|---|---|---|---|
| 3,018,247 | 1/1962 | Anderson et al. | 252/32.7 E |
| 3,149,077 | 9/1964 | Davis | 252/32.7 E X |
| 3,219,666 | 11/1965 | Norman et al. | 252/51.5 A X |
| 3,284,354 | 11/1966 | Tunkel et al. | 252/32.7 E |
| 3,389,083 | 6/1968 | Lyle et al. | 252/32.7 E |
| 3,489,682 | 1/1970 | LeSuer | 252/32.7 E |
| 3,502,677 | 3/1970 | LeSuer | 252/32.7 E X |
| 3,652,616 | 3/1972 | Watson et al. | 252/46.7 X |
| 4,010,107 | 3/1977 | Rothert | 252/32.7 E |

*Primary Examiner*—Andrew Metz
*Attorney, Agent, or Firm*—D. A. Newell; S. R. LaPaglia; V. J. Cavalieri

[57] ABSTRACT

Oil insoluble metal salts of lower dialkyl dithiophosphates are rendered oil soluble when combined with alkenyl or alkyl mono- or bis-succinimides. Oil compositions containing this combination are useful as crankcase lubricants.

12 Claims, No Drawings

OIL SOLUBLE METAL (LOWER) DIALKYL DITHIOPHOSPHATE SUCCINIMIDE COMPLEX AND LUBRICATING OIL COMPOSITIONS CONTAINING SAME

BACKGROUND OF THE INVENTION

1. Field of the Invention

This invention relates to a combination of an oil soluble metal (lower) dialkyl dithiophosphate and an alkenyl or alkyl succinimide and the use of said combination in lubricating oils employed for crankcase lubrication of internal combustion engines.

2. Description of the Prior Art

Metal dihydrocarbyl dithiophosphates are useful for a variety of purposes known in the art. The zinc dialkyl dithiophosphates in particular are employed as oxidation and corrosion inhibitors in lubricating oil compositions. There is a problem, however, with metal (lower) dialkyl $C_2$-$C_3$ dithiophosphates, in that they are essentially insoluble in lubricating oil compositions. For example, U.S. Pat. No. 2,344,393 teaches that it has become generally recognized that metal dithiophosphates should have one or more long chain alkyl groups preferably of about 12 carbon atoms to render them sufficiently soluble in lubricating oils to be of practical value. Also, U.S. Pat. No. 3,318,808 discloses that the higher carbon containing (above $C_4$) alkyls enhance oil solubility. Hence, combinations of $C_4$ and lower primary and/or secondary alcohol plus $C_5$ and above alcohols are selected at a ratio of the $C_5$ and higher to $C_4$ and lower to suit the balance between economics and solubility.

U.S. Pat. No. 3,190,833 teaches that metal hydrocarbyl dithiophosphates must contain a total of at least 7.6 aliphatic carbon atoms per phosphorous to be sufficiently soluble in lubricating oils to be useful as additives.

The insolubility and resulting essential nonuse of the metal (lower) dialkyl dithiophosphates, i.e., less than $C_4$, in crankcase lubricants is a severe drawback since they are prepared from $C_2$ and $C_3$ containing alcohols which are generally more readily available and less expensive than the higher carbon containing alcohols.

SUMMARY OF THE INVENTION

It has now been found that an oil insoluble metal $C_2$-$C_3$ dialkyl dithiophosphate may be made oil soluble by forming a complex between the dithiophosphate and an alkenyl or alkyl mono- or bis-succinimide.

Thus, this invention relates to a lubricating oil composition comprising a major amount of lubricating oil and a minor proportion sufficient to inhibit oxidation and corrosion of a complex prepared by reacting (a) a metal salt of a hydrocarbonyl dithiophosphoric acid of the formula

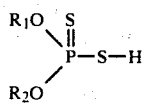

wherein each of $R_1$ and $R_2$ is alkyl of 2 to 3 carbon atoms the metal of said metal salt being a Group I metal, a Group II metal, aluminum, tin, cobalt, lead, molybdenum, manganese or nickel, with (b) an oil soluble alkenyl or alkyl mono- or bis-succinimide of the formula

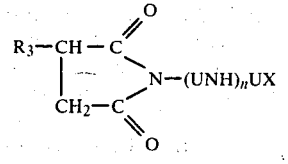

wherein X is amino or a group of the formula

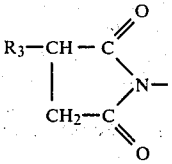

$R_3$ is an alkenyl or alkyl group containing from about 20 to 300 carbon atoms, U is alkylene containing 2 to 6 carbon atoms, n is an integer of from 0 to 6;

wherein the weight ratio of (b) to (a) is at least in the range of 3:1 to 10:1, preferably 4:1 to 5:1.

DETAILED DESCRIPTION

The metal dithiophosphates useful in the present invention are salts of (lower) dialkyl $C_2$ to $C_3$ dithiophosphoric acids and may be represented generally by the formula:

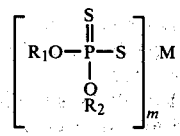

wherein $R_1$ and $R_2$ are defined above, M is a Group I metal, a Group II metal, aluminum, tin, cobalt, lead, molybdenum, manganese or nickel, and m is an integer which is equal to the valence of the metal M.

These compounds can be prepared by the reaction of a suitable alcohol or mixture of alcohols with phosphorus pentasulfide followed by reaction with the appropriate metal compound. Methods to prepare these compounds are described in U.S. Pat. Nos. 3,089,850, 3,102,096, 3,293,181 and 3,489,682 and the disclosures thereof are incorporated herein by reference.

Representative of the alcohols used to prepare the metal (lower) dialkyl $C_2$ to $C_3$ dithiophosphates include ethanol, propanol and isopropanol.

The metal salts which are useful in this invention include those salts containing metals selected from the class consisting of Group I metals, Group II metals, aluminum, lead, tin, molybdenum, manganese, cobalt, and nickel. Examples of metal compounds which may be reacted with the acid include lithium oxide, lithium hydroxide, lithium carbonate, lithium pentylate, sodium oxide, sodium hydroxide, sodium carbonate, sodium methylate, sodium propylate, sodium phenoxide, potassium oxide, potassium hydroxide, potassium carbonate, potassium methylate, silver oxide, silver carbonate, magnesium oxide, magnesium hydroxide, magnesium carbonate, magnesium ethylate, magnesium propylate, magnesium phenoxide, calcium oxide, calcium hydroxide, calcium carbonate, calcium methylate, calcium propylate, calcium pentylate, zinc oxide, zinc hydroxide, zinc carbonate, zinc propylate, strontium oxide, strontium hydroxide, cadmium oxide, cadmium hydroxide, cadmium carbonate, cadmium ethylate, barium oxide, barium hydroxide, barium hydrate, barium carbonate, barium ethylate, barium pentylate, aluminum oxide, aluminum propylate, lead oxide, lead hydroxide, lead carbonate, tin oxide, tin butylate, cobalt oxide, cobalt hydroxide, cobalt carbonate, cobalt pentylate, nickel oxide, nickel hydroxide, nickel carbonate, molybdenum oxide, and molybdenum oxysulfide.

The oil soluble alkenyl or alkyl mono- or bis-succinimides which are employed in the additive combination of this invention are generally known as lubricating oil detergents and are described in U.S. Pat. Nos. 2,992,708, 3,018,291, 3,024,237, 3,100,673, 3,219,666, 3,172,892 and 3,272,746, the disclosures of which are incorporated by reference. These materials are prepared by reacting an alkenyl or alkyl-substituted succinic anhydride of the formula

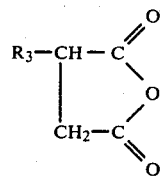

wherein $R_3$ is defined above, with a polyalkylenepolyamine of the formula $$H_2N-UNH_nUNH_2$$

wherein U and n are defined above.

The alkylene group designated by U, which contains from 2 to 6 carbon atoms, may be straight chain or branched, but will usually be straight chained. Illustrative alkylene groups are ethylene, propylene, 1,2-propylene, tetramethylene, hexamethylene, etc. The preferred alkylene groups are from two to three carbon atoms, there being two carbon atoms between the nitrogen atoms.

Non-limiting examples of suitable amine compounds include: 1,2-diaminoethane; 1,3-diaminopropane; 1,4-diaminobutane; 1,6-diaminohexane; diethylene triamine; triethylene tetramine, tetraethylene pentamine; 1,2-propylene diamine; and the like.

A product comprising predominantly mono- or bis-succinimide can be prepared by controlling the molar ratios of the reactants. Thus, for example, if one mole of amine is reacted with one mole of the alkenyl or alkyl substituted succinic anhydride, a predominantly mono-succinimide product will be prepared. If two moles of the succinic anhydride are reacted per mole of polyamine, a bis-succinimide will be prepared.

The prepartion of the alkenyl substituted succinic anhydride by reaction with a polyolefin and maleic anhydride has been described, e.g., U.S. Pat. Nos. 3,018,250 and 3,024,195. Reduction of the alkenyl substituted succinic anhydride yields the corresponding alkyl derivative. Polyolefin polymers for reaction with the maleic anhydride are polymers comprising a major amount of $C_2$ to $C_5$ mono-olefin, e.g., ethylene, propylene, butylene, isobutylene and pentene. The polymers can be homopolymers such as polyisobutylene as well as copolymers of two or more such olefins such as copolymers of: ethylene and propylene; butylene and isobutylene; etc. Other copolymers include those in which a minor amount of the copolymer monomers, e.g., 1 to 20 mole % is a $C_4$ to $C_8$ nonconjugated diolefin, e.g., a copolymer of isobutylene and butadiene or a copolymer of ethylene, propylene and 1,4-hexadiene; etc.

The olefin polymers contain from about 20 to 300 carbon atoms and preferably from 30 to 150 carbon atoms. An especially preferred polyolefin is polyisobutylene.

The lubricating oils of this invention contain an oil of lubricating viscosity and a complex which provides from about 5 to 30 millimoles/kg and preferably from 18 to 24 millimoles/kg of the oil insoluble metal (lower) dialkyl dithiophosphates and from 1.5 to 15 weight percent and preferably from 3 to 8 weight percent of the alkenyl or alkyl succinimide.

The complex, the exact structure of which is not known, may be formed by reacting the metal (lower) dialkyl $C_2$–$C_3$ dithiophosphate and the succinimide together neat at a temperature above the melting point of the mixture of reactants and below the decomposition temperature, or in a diluent in which both reactants are soluble. For example, the reactants may be combined in the proper ratio and heated together to form a homogeneous product which may be added to the oil or the reactants may be combined in the proper ratio in a solvent such as toluene or chloroform, the solvent stripped off, and the complex thus formed may be added to the oil.

The diluent is preferably inert to the reactants and products formed and is used in an amount sufficient to insure solubility of the reactants and to enable the mixture to be efficiently stirred.

Temperatures for preparing the complex may be in the range of from 25° C. to 180° C. and preferably 130° C. to 145° C. depending on whether the complex is prepared neat or in a diluent, i.e., lower temperatures may be used when a solvent is used. Since the metal (lower) dialkyl $C_2$–$C_3$ dithiophosphates are essentially insoluble in oil, the complex may not be made in-situ in the oil, e.g., addition of the insoluble diisopropyl dithiophosphate to an oil containing the appropriate ratio of a succinimide does not solubilize the dithiophosphate.

Weight percent ratios of alkenyl or alkyl mono- or bis-succinimides to metal (lower) dialkyl $C_2$–$C_3$ dithiophosphate in the complex in the range of 3:1 to 10:1 and preferably from 4:1 to 5:1 should be maintained. Lesser amounts of the succinimide will result in haziness and precipitation of the metal (lower) dialkyl $C_2$–$C_3$ dithiophosphates.

Additive concentrates are also included within the scope of this invention. They usually include from about 90 to 10 weight percent of an oil of lubricating viscosity and are normally formulated to have about 10 times the additive concentration that would be used in the finished lubricating oil composition. Usually, this will be a sufficient amount of complex to supply about 50 to 300 millimoles per kilogram of the metal (lower) dialkyl dithiophosphate and 15 to 150 weight percent of the alkenyl or alkyl succinimide. Typically, the concentrates contain sufficient diluent to make them easy to handle during shipping and storage. Suitable diluents for the concentrates include any inert diluent, preferably an oil of lubricating viscosity, so that the concentrate may be readily mixed with lubricating oils to prepare lubricating oil compositions. Suitable lubricating oils which can be used as diluents typically have viscosities in the range from about 35 to about 500 Saybolt Universal Seconds (SUS) at 100° F. (38° C.), although any oil of lubricating viscosity can be used.

Suitable lubricating oils which can be used to prepare a lubricating oil composition or concentrate are oils of lubricating viscocity derived from petroleum or synthetic sources. The oils can be paraffinic, naphthenic, halo-substituted hydrocarbons, synthetic esters, or combinations thereof. Oils of lubricating viscosity have viscosities in the range from 35 to 50,000 SUS at 100° F., and more usually from about 50 to 10,000 SUS at 100° F.

Other conventional additives which can be used in combinations with the additive combination of this invention include oxidation inhibitors, antifoam agents, viscosity index improvers, pour-point depressants, and the like. These include such compositions as chlorinated wax, benzyl disulfide, sulfurized sperm oils, sulfurized terpene, phosphorus esters such as trihydrocarbon phosphites, metal thiocarbamates such as zinc dioctyldithiocarbamate, polyisobutylene having an average molecular weight of 100,000, etc.

The lubricating oil compositions of the invention are useful for lubricating internal combustion engines, automatic transmissions and as industrial oils such as hydraulic oils, heat-transfer oils, torque fluids, etc. The lubricating oils can not only lubricate the engines but, because of their dispersancy properties, help maintain a high degree of cleanliness of the lubricated parts.

EXAMPLES

The following examples are provided to illustrate the invention. It is to be understood that they are provided for the sake of illustration only and not as a limitation on the scope of the invention.

EXAMPLE 1

Zinc diisopropyl dithiophosphate (A) Diisopropyl Dithiophosphoric Acid

To a two liter three-necked flask, equipped with a stirrer, nitrogen inlet, dropping funnel and condenser was charged under nitrogen 288.6 g (1.3 moles) $P_2S_5$ and 600 ml of toluene. To this slurry was added 312 g (5.2 moles) of isopropyl alcohol over a period of about seventeen minutes. After stirring for about 30 minutes, the reaction mixture was heated to reflux and maintained at reflux for about 2.5 hours. The clear yellow solution containing the reaction product was decanted off (1050 g) leaving a small amount of black solids; acid No. 241.6; 238.4 mgKOH/g equivalent weight 234.

(B) Zinc Diisopropyl Dithiophosphate

To a two liter three-necked flask equipped with a stirrer, nitrogen inlet, and a Dean-Stark trap/condenser was added under nitrogen, 526.5 g (2.25 eq.) of diisopropyl dithiophosphoric acid and about 600 ml toluene. To this solution was added 146.5 g zinc oxide (60% eq. excess) at which point the temperature rose to about 74° C. The reaction mixture was heated to reflux and maintained at reflux for about four hours. A total of about 20 ml of water was collected, after which the reaction mixture was further diluted with 200 ml toluene and filtered hot, two times through Celite. The clear filtrate was stripped in a Rotary-Evaporator under full pump vacuum and a water-bath temperature up to 72° C. The product obtained weighed 592.3 g and was a soft, white, crystalline solid—% zinc=14.00, % phosphorus=13.83.

In a similar manner, following the procedures described above, there was obtained zinc di-n-propyldithiophosphate and zinc diethyl dithiophosphate.

EXAMPLE 2

Various oil blends were prepared as indicated in Table 1 using Mid Continental Parrafic base oil (CC100N) and containing zinc diisopropyl dithiophosphate with and without the solubilizing polyisobutenyl succinimide dispersant component (prepared by reacting polyisobutenyl succinic anhydride wherein the number average molecular weight of the polyisobutenyl was about 950 and triethylenetetramine in a mole ratio of amine to anhydride of 0.87).

TABLE 1

| Component | Amount | Observation |
|---|---|---|
| zinc diisopropyl dithiophosphate | 3 mmoles/kg | solids present in oil |
| zinc diisopropyl dithiophosphate | 9 mmoles/kg | solids present in hazy oil |
| *zinc diisopropyl dithiophosphate plus polyisobutenyl succinimide of triethylenetetramine (3.5%) | 12 mmoles/kg | bright and clear oil solution |
| *zinc diisopropyl dithiophosphate plus polyisobutenyl succinimide of triethylenetetramine (3.5%) | 18 mmoles/kg | bright and clear oil solution |

*The zinc diisopropyl dithiophosphate and the succinimide were first dissolved in chloroform, the chloroform evaporated off and the complex blended into the oil.

EXAMPLE 3

4.03 g of zinc diisopropyl dithiophosphate and 17 g of the polyisobutenyl succinimide of triethylenetetramine of Example 2 were heated together at a temperature of 135° C. until homogeneous. 4.20 g of the product was used to make a 100 g oil blend containing 3.5% of the polybutenyl succinimide, 18 mmoles/kg (0.80% of zinc diisopropyl dithiophosphate, 30 mmoles/kg (0.77%) of a magnesium sulfonate, 20 mmoles/kg (0.86%) of a calcium phenate, and 5.5% of a polymethacrylate V.I. improver in RPM base oil of 130 N/480 N at 85%/15%.

The oil blend thus prepared was bright and clear.

EXAMPLE 4

2.0 g of zinc diisopropyl dithiophosphate and 9.0 g of a bispolyisobutenyl succinimide (prepared by reacting polyisobutenyl succinic anhydride wherein the number average molecular weight of the polyisobutenyl is about 950 and triethylenetetramine in a mole ratio of amine to anhydride of 0.5) were heated together at a temperature of 135° C. until homogeneous. 5.5 g of the product was used to make a 100 g oil blend containing 1% by weight of zinc diisopropyl dithiophosphate and 4.5% by weight of the bis-succinimide.

The oil blend thus prepared was bright and clear.

EXAMPLE 5

Formulated oils containing the additives shown in Table 2 were prepared and tested in a Sequence IIID test method (according to ASTM Special Technical Publication 315H). Formulation 1 was prepared by mixing the components together at 135° C. until homogeneous. The complex thus formed was added to the oil. Formulations 2, 3 and 4 were prepared by adding each of the components directly to the oil.

The purpose of the test is to determine the effect of the additives on the oxidation rate of the oil and the cam and lifter wear in the valve train of an internal combustion engine at relatively high temperatures (about 149° C. bulk oil temperature during testing).

In this test, an Oldsmobile 350 CID engine was run under the following conditions:

Runs at 3,000 RPM/max. run time for 64 hours and 100 lb load;
Air/fuel* ratio=16.5/1, using * GMR Reference fuel (leaded);
Timing=31° BTDC;
Oil temperature=300° F.;
Coolant temperature in=235° F.-out 245° F.;
30" of water of back pressure on exhaust;
Flow rate of jacket coolant=60 gal/min.;
Flow rate of rocker cover coolant=3 gal./min.;
Humidity must be kept at 80 grains of $H_2O$;
Air temperature controlled equal inlet equal 80° F.;
Blowby Breather Heat exchanger at 100° F.

The effectiveness of the additive is measured after 64 hours in terms of camshaft and lifter wear and % viscosity increase.

The comparisons were made in a formulated base oil RPM 130N/480N at 85%/15% containing 30 mmoles/kg of a magnesium sulfonate, 20 mmoles/kg of a calcium phenate and 5.5% of a polymethacrylate V.I. improver.

tion performance as compared with the other two zinc dialkyl dithiophosphate-succinimide combinations tested. These results were not expected since the decomposition temperature, as demonstrated by thermal gravimetric analysis (TGA) is lowest for the zinc diisopropyl dithiophosphate (decomposition temp. 170° C.) as compared to the zinc di(isobutyl/mixed primary hexyl) dithiophosphate (decomposition temp. 237° C.) and zinc di(2-ethylhexyl)dithiophosphate (decomposition temp. 251° C.).

EXAMPLE 6

Formulated oils containing the additives shown in Table 3 were prepared and tested in a Sequence V-D Test method Phase 9-L (according to candidate test for ASTM). This procedure utilizes a Ford 2.3 liter four cylinder engine. The test method simulates a type of severe field test service characterized by a combination of low speed, low temperature "stop and go" city driving and moderate turnpike operation. The effectiveness of the additives in the oil is measured in terms of the protection provided against sludge and varnish deposits and valve train water.

Formulation 1 was prepared by mixing the components together at 135° C. until homogeneous. The complex thus formed was added to the oil. Formulations 2 and 3 were prepared by adding each of the components directly to the oil.

The comparisons were made in a formulated base oil Cit-Con 100N/Cit-Con 200N at 55%/45% containing 30 mmoles/kg of a magnesium sulfonate, 20 mmoles/kg of a calcium phenate and 8.5% of a polymethacrylate V.I. improver.

TABLE 2

| Entry | Formulation | Cam + Lifter Wear × $10^{-3}$ In. | | Viscosity Increase % at 40 hr. | Viscosity Increase % at 64 hr. |
|---|---|---|---|---|---|
| | | SF Spec. Max (8) | SF Spec. Avg. (4) | | |
| 1 | 18 mmoles/kg zinc diisopropyl dithiophosphate + 3.5% succinimide of Example 2 | *2.8 | *1.2 | 214 | ****TVTM |
| 2 | 18 mmoles/kg zinc di(isobutyl/ mixed primary hexyl) dithiophosphate + 3.5% succinimide of Example 2 | **5.8 | **3.7 | 486 | TVTM |
| 3 | 18 mmoles/kg zinc di(2-ethyl-hexyl) dithiophosphate + 3.5% succinimide of Example 2 | 8.4 | 4.9 | 1880 | TVTM |
| 4 | ***2 mmoles/kg zinc diisopropyl dithiophosphate | 81.1 | 8.6 | 10 | TVTM |

*Average of 3 runs.
**Average of 2 runs.
***2 mmoles/kg zinc diisopropyl dithiophosphate was used since higher concentrations were not soluble in the oil.
****TVTM - too viscous to measure.

As indicated from the results shown in Table 2 the combination of zinc diisopropyl dithiophosphate and succinimide dispersant gave unexpected superior wear performance and essentially equivalent oxidation inhibi-

TABLE 3

| Entry | Formulation | Cam Lobe Wear × $10^{-3}$ | | Varnish | Sludge |
|---|---|---|---|---|---|
| | | SF Spec. Max. (2.5) | SF Spec. Avg. (1.0) | SF Spec. Avg. (6.6) | SF Spec. Avg. (9.4) |
| 1 | 8.1 mmoles/kg zinc diisopropyl dithiophosphate + 3.5% succinimide of Example 2 | *2.0 | *0.7 | 7.5 | 9.7 |
| 2 | 8.1 mmoles/kg zinc di(2-ethyl-hexyl) dithiophosphate + 3.5% succinimide of Example 2 | 10.8 | 5.8 | 8.8 | 9.3 |
| 3 | 8.1 mmoles/kg zinc di(isobutyl/ mixed primary hexyl) dithiophosphate + 3.5% succinimide | 7.8 | 4.0 | 7.0 | 8.0 |

TABLE 3-continued

| | Cam Lobe Wear $\times 10^{-3}$ | | Varnish | Sludge |
|---|---|---|---|---|
| Entry Formulation | SF Spec. Max. (2.5) | SF Spec. Avg. (1.0) | SF Spec. Avg. (6.6) | SF Spec. Avg. (9.4) |
| of Example 2 | | | | |

*Average of two runs.

As indicated from the results shown in Table 3, the combination of zinc diisopropyl dithiophosphate and succinimide dispersant gave superior wear performance relative to the zinc dithiophosphates derived from the primary alcohols (Entries 2 and 3).

What is claimed is:

1. A lubricating oil composition comprising a major amount of lubricating oil and a minor proportion sufficient to inhibit oxidation and corrosion of a complex prepared by reacting at about 25° to 180° C.
   (a) a metal salt of a (lower) dialkyl dithiophosphoric acid of the formula

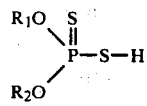

wherein each of $R_1$ and $R_2$ is alkyl of 2 to 3 carbon atoms, the metal of said metal salt being a Group I metal, a Group II metal, aluminum, tin, cobalt, lead, molybdenum, manganese or nickel; with
   (b) an oil soluble alkenyl or alkyl mono- or bis-succinimide of the formula

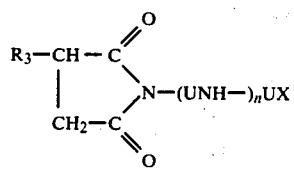

wherein X is amino or a group of the formula

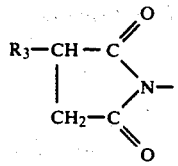

$R_3$ is an alkenyl or alkyl group containing from about 20 to 300 carbon atoms, U is alkylene containing 2 to 6 carbon atoms, n is an integer of from 0 to 6;
   wherein the weight of ratio of (b) to (a) is at least in the range of from 3:1 to 10:1.

2. The composition of claim 1 wherein component (a) is present from about 5 mmoles to 30 mmoles and component (b) is present from about 1.5% to about 15% by weight.

3. The composition of claim 1 wherein component (a) is of the formula

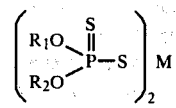

wherein $R_1$ and $R_2$ is alkyl of 2 to 3 carbon atoms, M is a Group II metal; and component (b) is of the formula

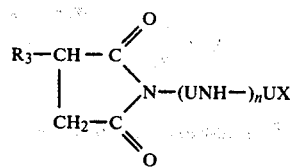

wherein X is amino or a group of the formula

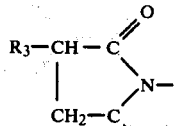

$R_3$ is polyisobutenyl, U is ethylene and n is an integer of from 1 to 4.

4. The composition of claim 3 wherein component (a) is zinc diisopropyldithiophosphate and component (b) is of the formula

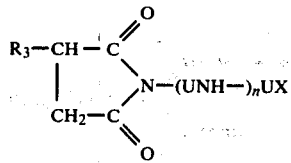

wherein X is amino or

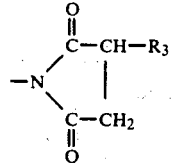

$R_3$ is polyisobutenyl, U is ethylene and n is an integer of from 2 to 4.

5. The composition of claim 4 wherein in component (b) n is 2.

6. A lubricating oil concentrate comprising 10% to 90% by weight of a lubricating oil and from about 10% to about 90% by weight of an oxidation and corrosion inhibiting complex prepared by reacting at about 25° to 180° C.

(a) a metal salt of a (lower) dialkyl dithiophosphoric acid of the formula

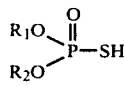

wherein each of $R_1$ and $R_2$ is alkyl of 2 to 3 carbon atoms, the metal of said metal salt being a Group I metal, a Group II metal, aluminum, tin, cobalt, lead, molybdenum, manganese or nickel; with (b) an oil soluble alkenyl or alkyl mono- or bis-succinimide of the formula

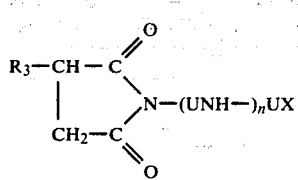

wherein X is amino or a group of the formula

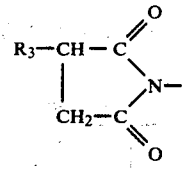

$R_3$ is an alkenyl or alkyl group containing from about 20 to 300 carbon atoms, U is alkylene containing 2 to 6 carbon atoms, n is an integer of from 0 to 6, wherein the weight ratio of (b) to (a) is at least in the range of from 3:1 to 10:1.

7. The lubricating oil concentrate of claim 6 wherein component (a) is zinc diisopropyldithiophosphate and component (b) is of the formula

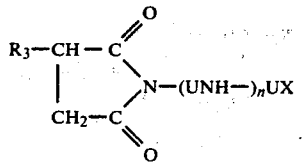

wherein X is amino or

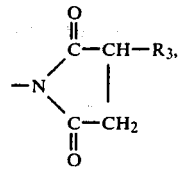

$R_3$ is polyisobutenyl, U is ethylene and n is an integer of from 2 to 4.

8. The lubricating oil concentrate of claim 7 wherein in component (b) n is 2.

9. A composition comprising a complex prepared by reacting at about 25° to 180° C.

(a) a metal salt of a (lower) dialkyl dithiophosphoric acid and of the formula

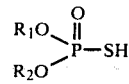

wherein each of $R_1$ and $R_2$ is alkyl of 2 to 3 carbon atoms, the metal of said metal salt being a Group I metal, a Group II metal, aluminum, tin, cobalt, lead, molybdenum, manganese or nickel; with (b) an oil soluble alkenyl or alkyl mono- or bis-succinimide of the formula

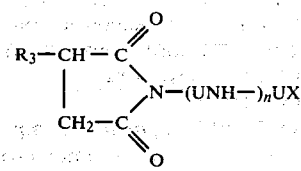

wherein X is amino or a group of the formula

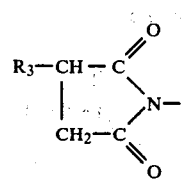

$R_3$ is an alkenyl or alkyl group containing from about 20 to 300 carbon atoms, U is alkylene containing 2 to 6 carbon atoms, n is an integer of from 0 to 6, wherein the weight ratio of (b) to (a) is at least in the range of from 3:1 to 10:1.

10. The composition of claim 9 wherein component (a) is of the formula

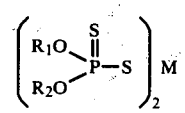

wherein $R_1$ and $R_2$ is alkyl of 2 to 3 carbon atoms, M is a Group II metal; and component (b) of the formula

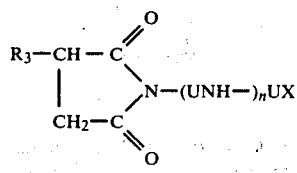

wherein X is amino or a group of the formula

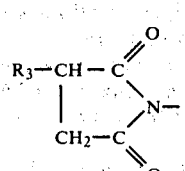

$R_3$ is polyisobutenyl, U is ethylene and n is an integer of from 1 to 4.
11. The composition of claim 10 wherein component (a) is zinc diisopropyl dithiophosphate and component (b) is of the formula
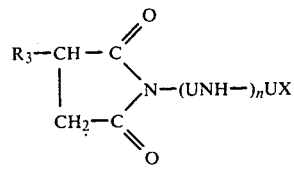
wherein X is amino or
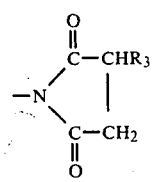
$R_3$ is polyisobutenyl, U is ethylene, and n is an integer of from 2 to 4.
12. The composition of claim 11 wherein in component (b) n is 2.
* * * * *

UNITED STATES PATENT AND TRADEMARK OFFICE
CERTIFICATE OF CORRECTION

PATENT NO. : 4,306,984
DATED : December 22, 1981
INVENTOR(S) : Elaine S. Yamaguchi It is certified that error appears in the above-identified patent and that said Letters Patent are hereby corrected as shown below:

Column 8, line 23, "train water" should read --train wear--.

Column 11, line 5,

" 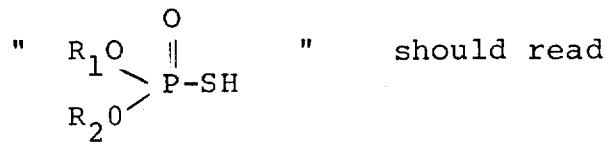 "  should read

-- 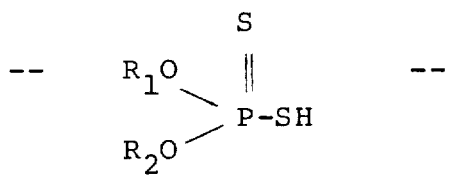 --

Column 12, line 3, same change in formula as above.

Signed and Sealed this

Twentieth Day of April 1982

[SEAL]

Attest:

GERALD J. MOSSINGHOFF

Attesting Officer   Commissioner of Patents and Trademarks